(12) United States Patent
Yang

(10) Patent No.: US 10,780,899 B1
(45) Date of Patent: Sep. 22, 2020

(54) FOLDABLE AERODYNAMIC DRAG REDUCING PLATE ASSEMBLY FOR A DOMESTIC OR INTERMODAL CONTAINER

(71) Applicant: Charles C. Yang, Surprise, AZ (US)

(72) Inventor: Charles C. Yang, Surprise, AZ (US)

( * ) Notice: Subject to any disclaimer, the term of this patent is extended or adjusted under 35 U.S.C. 154(b) by 0 days.

(21) Appl. No.: 16/705,763

(22) Filed: Dec. 6, 2019

Related U.S. Application Data

(63) Continuation-in-part of application No. 16/420,666, filed on May 23, 2019.

(51) Int. Cl.
*B61D 17/02* (2006.01)

(52) U.S. Cl.
CPC .................... *B61D 17/02* (2013.01)

(58) Field of Classification Search
CPC ....................................... B61D 17/02
USPC ....................................... 296/180.4
See application file for complete search history.

(56) References Cited

U.S. PATENT DOCUMENTS

| | | | | |
|---|---|---|---|---|
| 2,243,906 A * | 6/1941 | Huet | ........................ | B61C 1/06 105/1.1 |
| 2,468,590 A * | 4/1949 | Dean | ....................... | B61D 17/02 105/21 |
| 3,697,120 A * | 10/1972 | Saunders | ............. | B62D 35/001 296/180.4 |
| 3,854,769 A * | 12/1974 | Saunders | ............. | B62D 35/001 296/180.4 |
| 4,682,808 A * | 7/1987 | Bilanin | ................ | B62D 35/001 296/180.4 |
| 4,756,256 A * | 7/1988 | Rains | ....................... | B61D 3/02 105/1.1 |
| 4,867,397 A * | 9/1989 | Pamadi | .................. | B62D 35/00 296/180.1 |
| 4,966,407 A | 10/1990 | Lusk | | |
| 5,465,669 A | 11/1995 | Andrus | | |
| 6,546,878 B1 | 4/2003 | Smith et al. | | |
| 6,669,270 B1 * | 12/2003 | Card | .................... | B62D 35/008 296/180.1 |

(Continued)

FOREIGN PATENT DOCUMENTS

| CA | 2827931 | 3/2014 |
|---|---|---|
| DE | 102016120817 U1 | 11/2015 |

(Continued)

OTHER PUBLICATIONS

Thesis: "Increasing Railway Efficiency and Capacity Through Improved Operations, Control and Planning", by Yung-Cheng Lai B.S., National Taiwan University, 2002 M.S., University of Illinois at Urbana-Champaign, 2004. (See attached Lai_PhD.pdf).

(Continued)

*Primary Examiner* — Hilary L Gutman
(74) *Attorney, Agent, or Firm* — Mark V. Loen

(57) ABSTRACT

The embodied invention is a foldable aerodynamic drag reducing plate assembly that is installed on shipping container front ends. The drag reducing plates incorporate hinges and attaching components specifically designed for the spacing and position of vertical rods that are part of a standard shipping container. The drag reducing plates include locking bars that provide stability against air wind when a train moves at high speeds. Also, connecting clips, stiffening channels, or hinges are used to combine the drag reducing plate elements design into a single unit.

4 Claims, 8 Drawing Sheets

(56) References Cited

U.S. PATENT DOCUMENTS

| | | |
|---|---|---|
| 6,854,788 B1 | 2/2005 | Graham |
| 6,986,544 B2 * | 1/2006 | Wood .................. B62D 35/001 296/180.1 |
| 7,073,845 B2 * | 7/2006 | Ortega ................. B62D 35/001 296/180.2 |
| 7,784,409 B2 | 8/2010 | Iden et al. |
| 7,827,918 B2 | 11/2010 | Iden et al. |
| 8,215,239 B2 | 7/2012 | Iden |
| 8,511,236 B2 | 8/2013 | Iden |
| 8,517,452 B2 * | 8/2013 | Kenevan ............. B62D 35/001 180/903 |
| 8,827,351 B1 * | 9/2014 | Kenevan ............. B62D 35/001 180/903 |
| 2010/0258029 A1 | 10/2010 | Iden et al. |
| 2013/0106136 A1 | 5/2013 | Smith et al. |
| 2015/0102633 A1 | 4/2015 | Dieckmann et al. |
| 2016/0236726 A1 | 8/2016 | Baker et al. |
| 2017/0361880 A1 | 12/2017 | Gardner |
| 2018/0043943 A1 | 2/2018 | Polidori et al. |

FOREIGN PATENT DOCUMENTS

| | | | | |
|---|---|---|---|---|
| FR | 788753 A | * | 10/1935 | ............. B61D 17/02 |
| GB | 2098558 A | * | 11/1982 | ........... B62D 35/004 |
| GB | 2275234 A | * | 8/1994 | ........... B62D 35/001 |
| WO | WO-2018202608 A1 | * | 11/2018 | ........... B62D 35/001 |

OTHER PUBLICATIONS

Thesis: "Aerodynamic Drag on Intermodal Rail Cars", by Philip Donovan Kinghorn, Brigham Young University, Jun. 1, 2017, (See attached Kinghorn_PhD.pdf).

Thesis: "An investigation of train drag reduction using sub-boundary layer vortex generators on a simplifiedintermodal well car geometry" by Alexander M. Peters, Iowa State University, 2017 (See attached Peters_PhD.pdf).

Trailer Drag Reduction Report, Anna Sawabini et al. (See attached Sawabini_Report.pdf) most closely related, Jun. 2001.

* cited by examiner

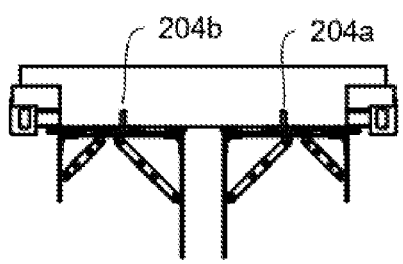
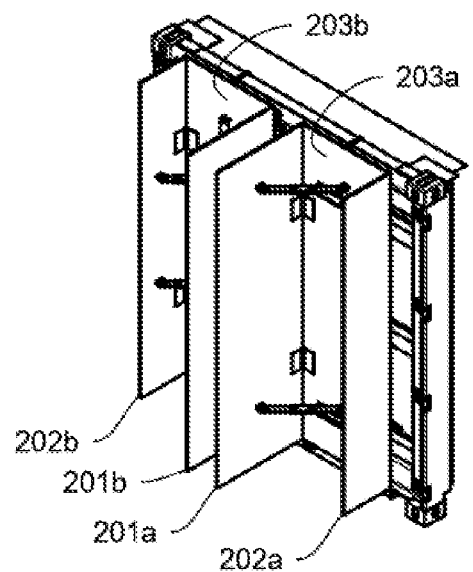
Fig. 2C
Fig. 2E
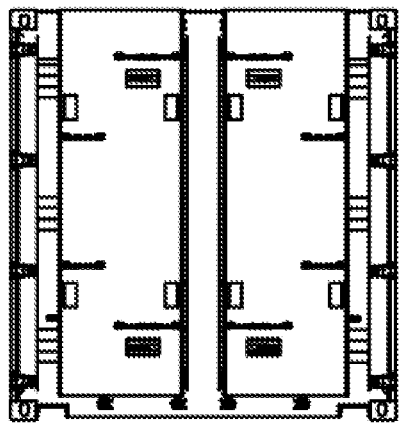 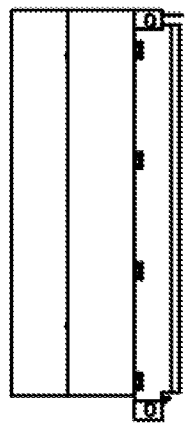
Fig. 2A  Fig. 2B
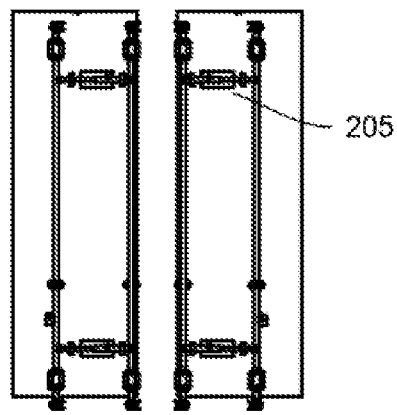
Fig. 2D

FOLDABLE AERODYNAMIC DRAG REDUCING PLATE ASSEMBLY FOR A DOMESTIC OR INTERMODAL CONTAINER

CROSS REFERENCE TO RELATED APPLICATIONS

This application is a continuation in part of U.S. utility application Ser. No. 16/420,666 filed on May 23, 2019. The entire contents of the prior application are incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to air drag reducing components that are attached to vertical locking rods which provide a reduced aerodynamic drag on intermodal containers.

(2) Description of Related Art

US publication number 20100258029A1 describes air drag reducing devices (drag reducers) designed for a train container. However, the devices have not been widely implemented due to certain issues. The current drag reducers are over large for a single person to handle and maneuver into position for attachment. They also take up a lot of storage space when not in use.

U.S. Pat. No. 7,930,979 is another example of an over-complicated air stream design that requires a crane to lift as a practical matter.

As a practical matter, drag reducers have to be capable of being installed and removed when the container is positioned on a railroad flat car (or a well car), adding to the height off the ground and further complicating efforts to safely and securely attach them. The difficulties in handling require multiple individuals with ladders to install current art drag reducers.

When one or two containers are on a moving train car, each container must have a drag reducer for efficient air flow. Other art designs utilize only one aerodynamic kit on the container immediately following the locomotive.

As another practical matter, a drag reducer cannot be permanently attached. Intermodal containers are used for ocean shipping and stacked in a highly compact manner, including the front ends. Permanent shrouds increase shipping costs as it requires containers to be separated further apart, resulting in a lower density shipping. Additionally, during shipping, the containers get the advantage of platooning, that is, the upstream car breaks the wind for the next car downwind.

Another difficulty is that the containers are installed on railroad container cars that require car to car couplers which make the containers separated by gaps of at least eleven feet. The gaps are too long to have the advantage of platooning.

Efficiency improvements by air drag reducers are approximately 6-25%, depending upon the design.

BRIEF SUMMARY OF THE INVENTION

The embodied invention is a foldable aerodynamic drag reducing plate assembly that is installed on shipping container front ends. The drag reducing plates incorporate hinges and attaching components specifically designed for the spacing and position of vertical rods that are part of a standard shipping container. The drag reducing plates include locking bars that provide stability against air wind when a train moves at high speed. Also, connecting clips, stiffening channels, or hinges are used to combine the drag reducing plate elements design into a single unit.

BRIEF DESCRIPTION OF THE SEVERAL VIEWS OF THE DRAWING(S)

FIGS. 2A-2E show another exemplary wind plate design utilizing four faring wind plates.

DETAILED DESCRIPTION OF THE INVENTION

Figure 1C:
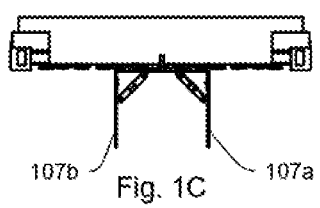
FIGS. 1A-1F show an exemplary dual fairing plate wind design.
Figure 1F:
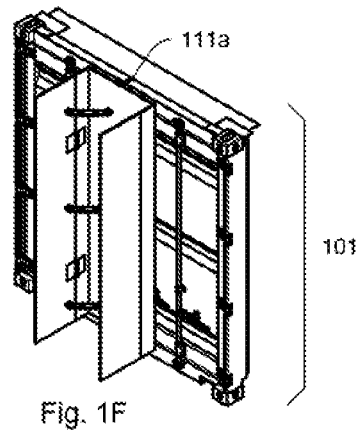
Figure 1A:
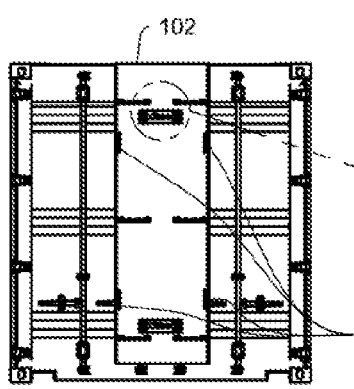

In FIG. 1A, a two plate air reducing drag design is shown with two front wind plates 107a,b with each connected to a base plate 102 by hinges 124 at their edges. Preferably, the two front wind plates are perpendicular to the base plate.

Figure 1G:
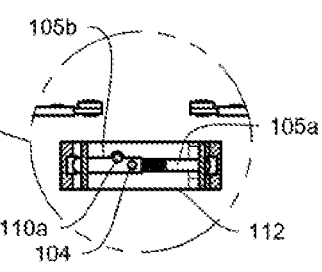
FIG. 1G shows an enlargement of the cutout opening to allow access to the vertical rod clamps.
Figure 1B:
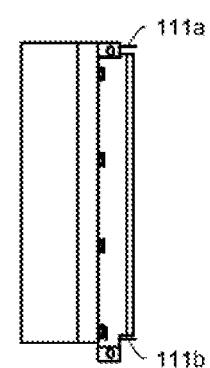
Figure 1D:
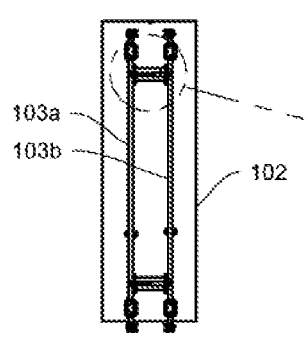
Figure 1E:
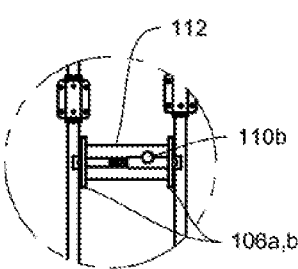

FIGS. 1B, 1C, 1D, 1E, and 1F show right side, top, back, an isometric view of FIG. 1A. FIG. 1E shows important detail of how the base plate 102 is attached to vertical bars that are mounted on the front of a typical intermodal container 101. In FIG. 1D, the vertical rods 103a,b are shown from a rear view with the remainder of intermodal container not shown.

In FIG. 1E, a cutout opening 112 in the base plate provides an access portal to a telescoping locking rod assembly with release button 104, which is connected to the base plate 102 by support plates 106a,b. The support plates are a rectangular plate with rounded edges and are welded to the base plate 102. The support plates include through holes for the threaded shaft 105a and the geared shaft 105b. The locking rod assembly locks onto the intermodal container vertical rods.

In FIG. 1F, a hanger 111a prevents the base plate from slipping downward on the front 101 of the intermodal container. Optionally, the hanger includes a hinge (not shown) that allows it to be folded down for storage. This feature is included in other embodiments.

Figure 6:
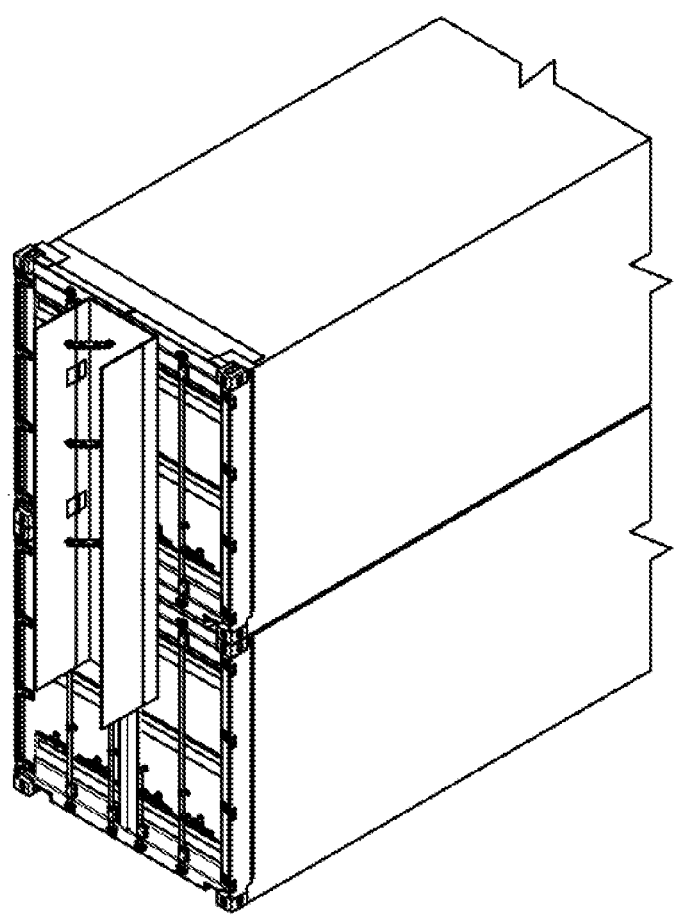
FIG. 6 shows the exemplary dual fairing plate wind design on two stacked intermodal containers.

Optionally, in the case of a double stacked container, the base plate 102 can be extended further downward to cover the front a lower container in whole or in part as shown in FIG. 6. This provides enhanced front coverage and better aerodynamic performance. An additional cutout opening can be located on the extended base plate to provide the ability to lock the aerodynamic design to the lower container.

Optionally, another hanger 111b (FIG. 1B) is added to the bottom edge. This additional hanger allows the left and right half assembly to be the same, which provides for lower storage requirements as only one assembly is needed for the left or right half. A second bottom edge hanger is an option for any disclosed assembly.

In FIG. 1G, a cutout opening 112 provides access to the locking rod tightening nut 110a, and the release button (not visible in this view). A threaded shaft 105a and a geared shaft 105b that are threaded together. The cutout opening and the threaded/geared shafts are used in other figures.

Figure 1H:
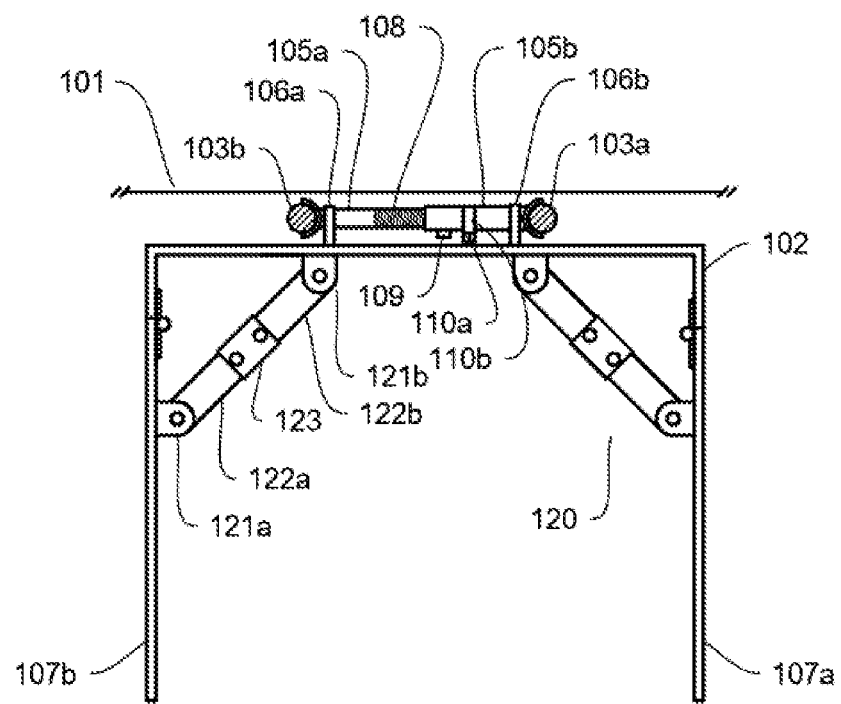
FIGS. 1H-1I show an enlarged view of the dual fairing plate and how it folds up for convenient and compact storage.

In FIG. 1H, the illustration of a locking rod assembly is shown. A threaded shaft 105a and a geared shaft 105b that are threaded together. A tightening nut 110a is rotated to turn an internal screw 110b that engages the threads 108 and causes the two locking arms 105a,b to extend and press against the vertical rods 103a,b of a container front. The threaded shaft is ratcheted by the gear shaft so that it extends, but does not contract, unless the ratchet release button 109 is pressed. The tightening nut is preferably rotated by a wrench or an attachable wheel designed to fit the nut.

The locking rod assembly shown in FIG. 1H is utilized in the other embodiments. Additionally, the locking rod assembly can be utilized for both domestic and international containers.

A plurality of locking bar assemblies 120 are used to stiffen the connection of the two front plates 107a,b to the base plate 102. The assemblies comprise two mounting brackets 121a,b which are rotatably connected to stiffening bars 122a,b and a locking bracket 123. The stiffening bars rotate with respect to the locking bracket. Other stiffening bars or locking rod designs could equally be utilized.

The locking bracket is shown in a reduced length for the sake of an uncluttered illustration. The locking bracket preferably includes locking pins (not shown) that prevents rotation between the stiffening bars and the locking bracket. Alternately, the locking bracket is stabilized by a separate insert (not shown) that is pushed into the locking bracket to prevent rotation. The locking bracket includes snap tabs (not shown) that capture the stiffening bars and prevent rotation. Other methods of preventing the rotation of the stiffening bars could equally be utilized.

Figure 1I:
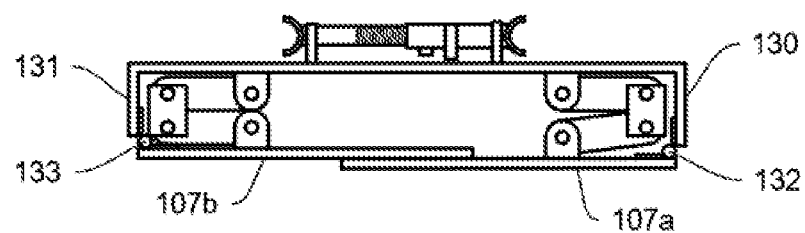

The illustrated locking bar design provides the advantage of foldability as seen in FIG. 1I. Additionally, to provide compact size when folded, the base plate edges 130, 131 are extended to slightly different lengths so the hinges 132,133 can be rotated 90 degrees, and the plates can be fold flat as illustrated in FIG. 1I. The front plates 107a,b are the same size.

FIGS. 2A-2E show different views of a four plate fairing design 201a,b, 202a,b with two separate bases 203a,b. The design utilizes a plurality of hinges and locking bar assemblies as shown and described in FIGS. 1A-1G. The locking bars are similarly designed to the locking bar shown in FIG. 1H and include a hanger 204a,b. Four cutout openings (exemplary opening is labeled 205) in the base plate provides an access portal to the telescoping locking rod assembly.

The four fairing plates are designed so that two halves are mirrored about the center, simplifying the design as seen in FIG. 2E. That is, lengths 201a and 201b are equal, and 202a and 202b are equal. Consequently, when making the fairing plate assemblies, the manufacture and operation become less complicated. Similarly, as shown in FIG. 1B, another hanger is optionally added to the lower edge for a simplified manufacture and operation.

In an alternative embodiment, the fairing plates and base plates can all be the same size (i.e. same width and height) to simplify manufacture and operation.

Figure 3F:
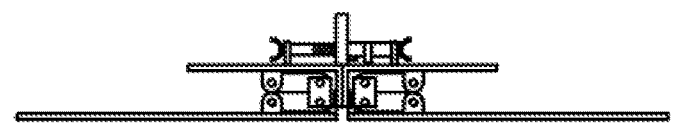
FIGS. 3A-3F show another exemplary wind plate design utilizing a single front fairing plate designed in two connected parts.
Figure 3C:
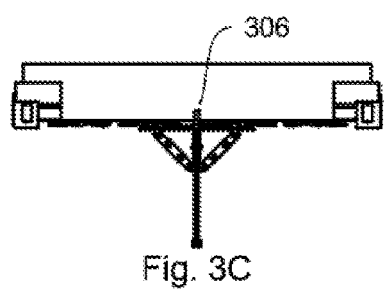
Figure 3E:
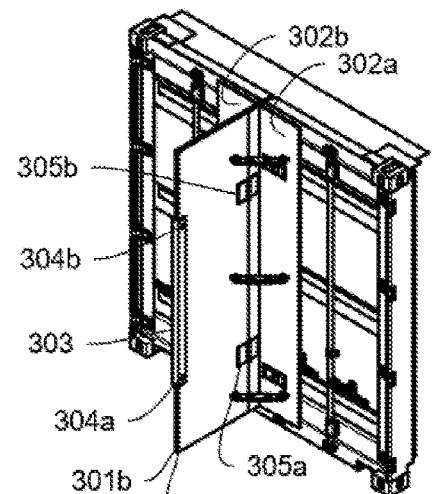
Figure 3A:
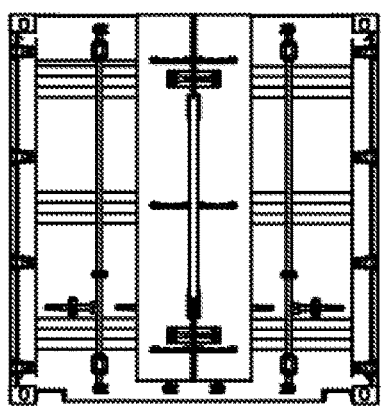
Figure 3B:
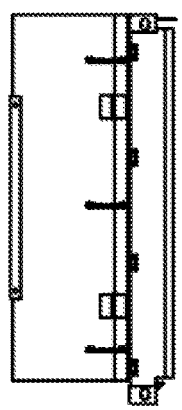
Figure 3D:
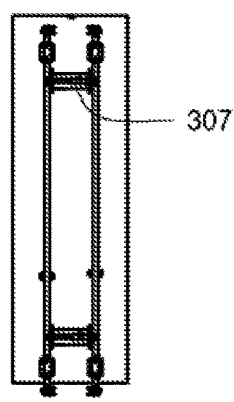
Figure 4C:
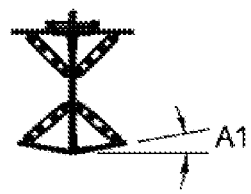
FIGS. 4A-4E show a front wind plate design in two connected parts.
Figure 4E:
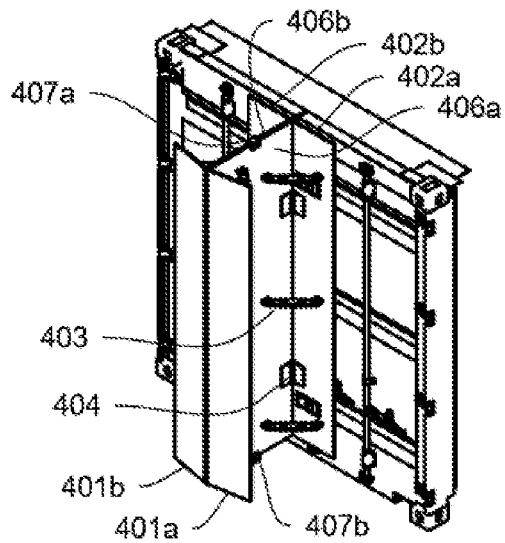
Figure 4A:
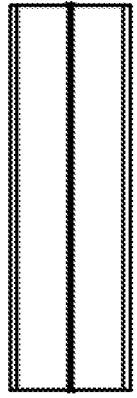
Figure 4B:
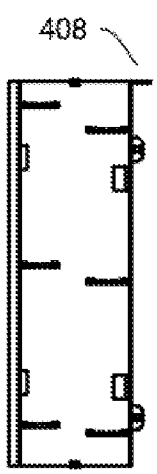
Figure 4D:
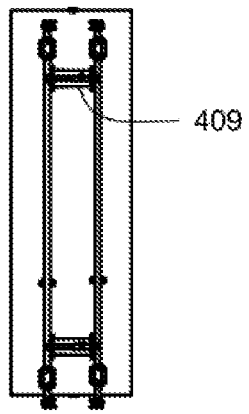
Figure 5A:
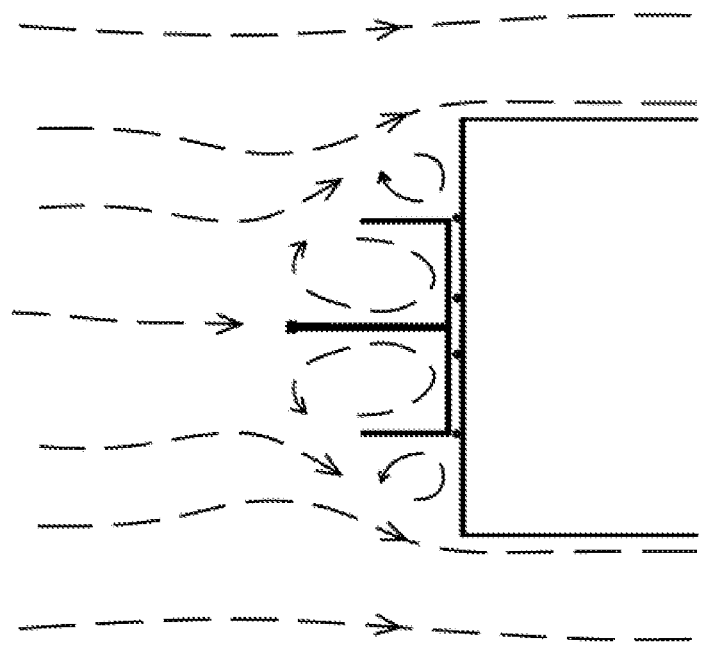
FIGS. 5A-5D show estimated air flow around exemplary wind plate designs.
Figure 5B:
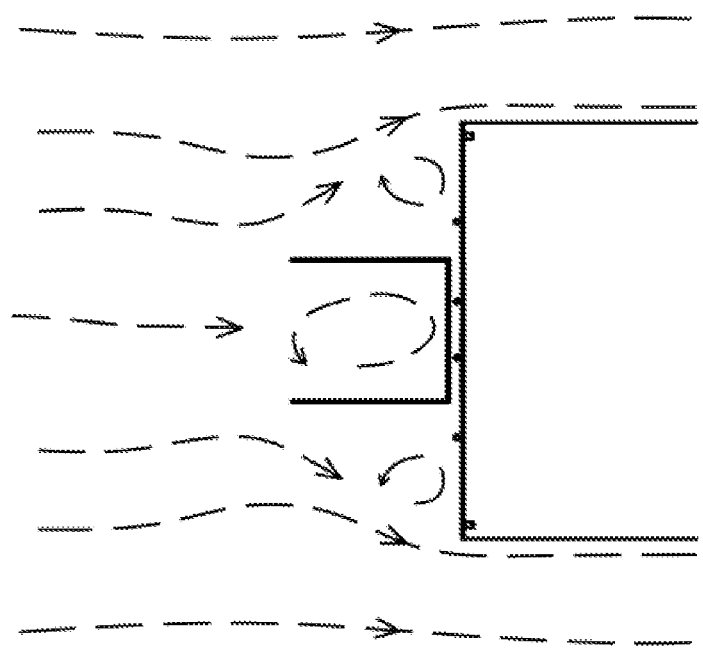
Figure 5C:
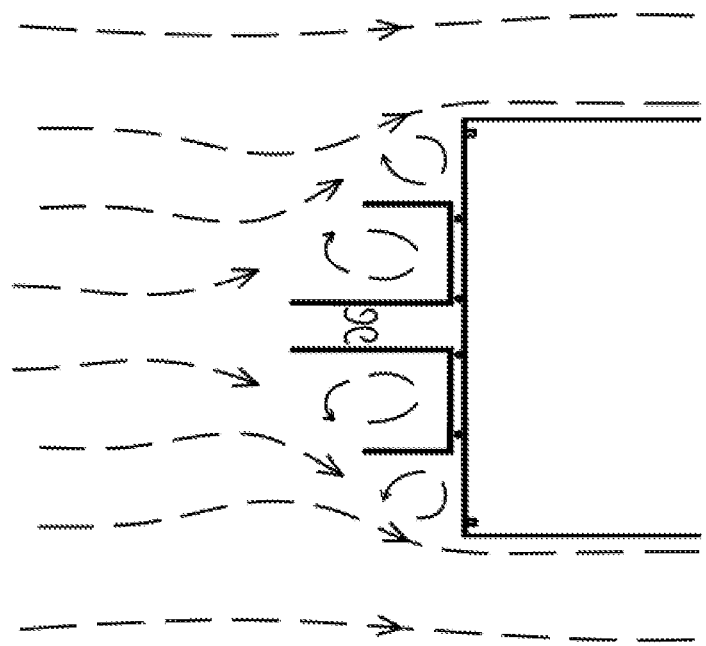
Figure 5D:
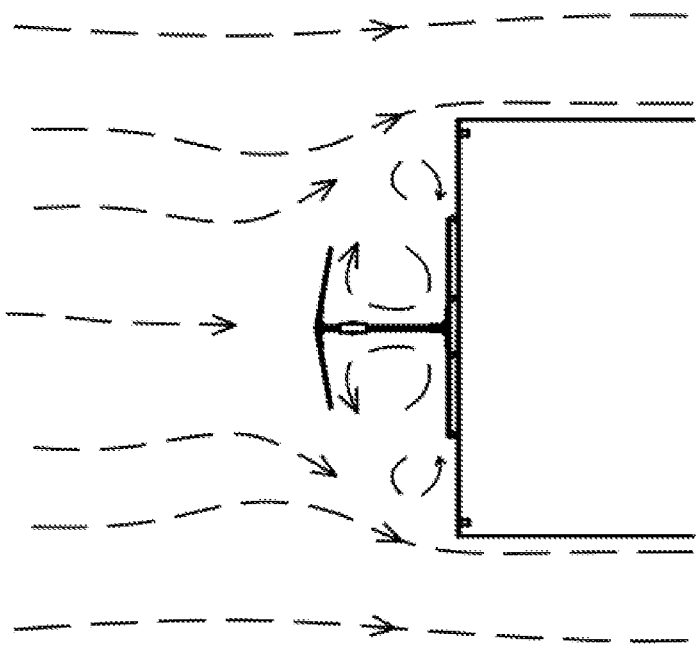

FIGS. 3A-3E show a single projecting (fairing) plate design that is a combination of two fairing plates 301a,b that are connected by a U bracket 303 and locking pins 304a,b (FIG. 3E). Two back plates 302a,b are connected to the front fairing plates 301a,b respectively by two hinges 305a,b. Each back plate with attached hinges and projecting fairing plates constitutes a separate foldable part of the two part design. Two cutout openings (exemplary opening is labeled 307) in the base plate provides an access portal to the telescoping locking rod assembly. A hanger 306 is also included.

FIG. 3F shows an enlarged view of the fairing plate design when folded.

As seen in FIGS. 3A-3F, there are a total of six locking bars in the design. The locking bars are similarly designed to the locking bar shown in FIG. 1H.

The U bracket is also preferably designed to include a spring pin and predrilled holes on the front fairing plates for a rapid installation.

FIGS. 4A-4E is front wind plate design. In this case, two front wind plate halves 401a,b are mildly angled 0-30 degrees (A1, FIG. 4C) from perpendicular to the train direction and are supported by projecting plates 406a,b respectively. Two base plates 402a,b are used to connect to the front of a container by methods already discussed. Each base plate is hinged (exemplary hinge 404 is labeled) to a front projecting plate, which in turn is hinged to a front wind plate. Two U brackets 407a,b join the two projecting plates to stiffen the overall plate assembly with the goal of stable wind deflection. The U brackets are illustrated as a short length, but this is not a strict requirement, and the length may encompass up the entire projecting plate length.

Six locking bars, (exemplary locking bar 403 is labeled) are used to stiffen the two base plates to the projecting plates. The locking bars are similarly designed to the locking bar shown in FIG. 1H.

Two cutout openings (exemplary opening is labeled 409) in the base plate provides an access portal to the telescoping locking rod assembly. A hanger 408 is attached to the middle of the base plate at the upper edge as illustrated.

It is generally conceived that the plates used in the foldable aerodynamic drag reducing plate assembly will be made from a lightweight material, such as an engineered plastic or a thin metal sheet with optional structural strength support. Durability in frequent and long term use, and the ability to withstand moderate mishandling and storage are important design criteria.

In a preferred embodiment, each container being transported by a train is covered by a foldable aerodynamic drag reducing plate assembly. Alternatively, in the case of a double stacked container, the upper container drag reducing plate assembly can be extended to cover the lower container. As already mentioned, an additional cutout opening can be located on the extend base plate to provide the ability to lock the aerodynamic design to the lower container.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

I claim:

1. A foldable aerodynamic drag reducing plate assembly for a front of a first intermodal container comprising:
   A) a rectangular shaped base plate,
   B) a first hanger attached and positioned substantially at a center top edge of said base plate,
   C) two rectangular shaped fairing plates,
   D) both said fairing plates are attached to a separate vertical edge of said base plate by a plurality of hinges and by a plurality of locking bar assemblies,
   E) at least one locking rod assembly connected to said base plate, said locking arm assembly further comprising:
      a) a geared shaft and a threaded shaft,
      b) said geared shaft and said threaded shaft each having an attaching element,
      c) said attaching element shaped to engage with intermodal container vertical rods,
      d) a first attaching plate connecting said base plate to said geared shaft,
      e) a second attaching plate connecting said base plate to said threaded shaft,
      f) said threaded shaft having a tightening screw and a release button, and
      g) a locking rod assembly access portal located substantially adjacent to said release button.

2. The foldable aerodynamic drag reducing plate assembly according to claim 1, each said locking bar assembly further comprising:
   A) two mounting brackets,
   B) two locking bars, and
   C) a locking bracket connecting said locking bars.

3. The foldable aerodynamic drag reducing plate assembly according to claim 2 wherein a second hanger is attached and positioned substantially at a center bottom edge of said base plate.

4. The foldable aerodynamic drag reducing plate assembly according to claim 1, wherein said base plate is vertically long enough to cover the front of a second intermodal container stacked below said first intermodal container.

* * * * *